Oct. 13, 1931.  A. G. HENRICKS  1,827,013
TRANSMISSION MECHANISM
Filed Jan. 31, 1927
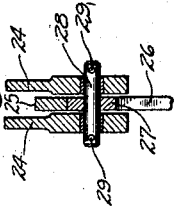
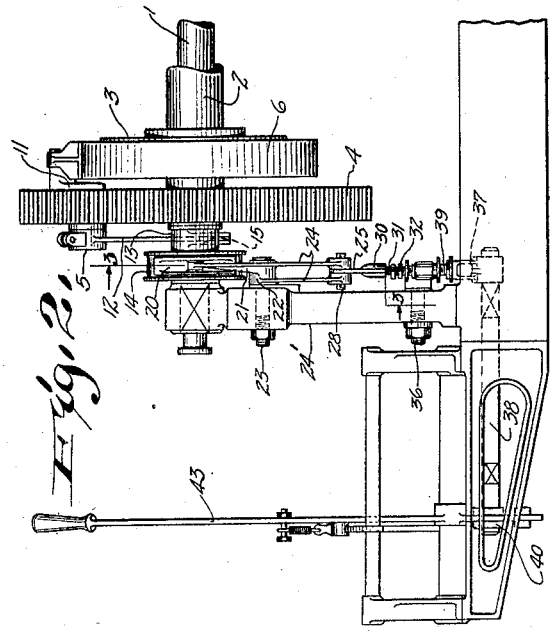
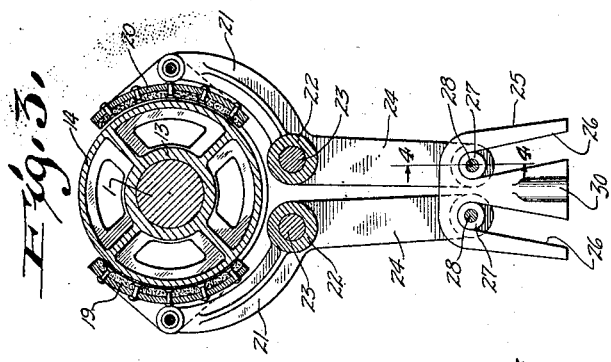
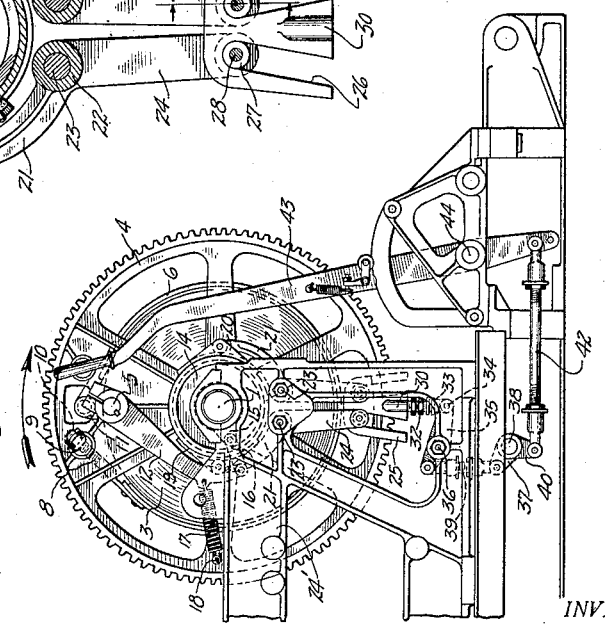
INVENTOR.
ARTHUR G. HENRICKS.
BY
ATTORNEYS.

Patented Oct. 13, 1931

1,827,013

UNITED STATES PATENT OFFICE

ARTHUR G. HENRICKS, OF MILWAUKEE, WISCONSIN, ASSIGNOR TO HARNISCHFEGER CORPORATION, OF MILWAUKEE, WISCONSIN, A CORPORATION OF WISCONSIN

TRANSMISSION MECHANISM

Application filed January 31, 1927. Serial No. 164,696.

This invention relates to improvements in transmission mechanism of the type used in connecting cable drums such as are used in excavator cranes and the like to the motive power or prime mover, and more particularly to means for connecting and disconnecting the drums to and from the prime mover.

Excavator cranes for which transmission mechanism made in accordance with the present invention is particularly adapted comprise, in general, a plurality of drums or other power transmitting elements loosely mounted on independent shafts, a suitable power plant such as an internal combustion engine for driving the shafts, and transmission mechanism arranged between the shafts and drums and adapted to connect the latter to the shafts for rotation therewith at the will of the operator who actuates suitable levers connected to the transmission mechanism for this purpose. An example of the type of excavator crane referred to is more clearly shown and described in Patent No. 1,570,108 of January 19, 1926, to Lewis Wehner, in which the transmission mechanism is shown as comprising, in general, a friction clutch associated with each drum and connected to the respective drive shaft for rotation therewith, and an actuating member adapted to apply the clutch whereby the drum is operatively connected to the shaft for rotation therewith. The means for effecting movement of the actuating member is shown as comprising levers which act directly upon the member through suitable connections between the same and the levers. Although this arrangement has proven satisfactory in many respects, it has the disadvantage that on account of the direct connections between the levers and actuating members for the clutches considerable force must be applied to the levers on the part of the operator to effect proper connection of the drums to the drive shafts for rotation therewith, the force required in some cases being as great as fifty pounds.

In transmission mechanism of this type, furthermore, the extent to which the friction clutches are applied to the drums depends directly upon the pull which the operator exerts upon the actuating levers, and as a slight variance in the pull exerted on the levers makes considerable difference in the operation of the machine, the skill of the operator is depended upon to a large extent in making the machine operate at its greatest efficiency.

One of the objects of the present invention, therefore, is to provide improved transmission mechanism adapted for arrangement between the actuating levers and the friction clutches for connecting the drums to the drive shafts, so that the force exerted by the operator upon the actuating levers need be comparatively small and will be multiplied a sufficient numer of times to equal in effect the greater force which must be applied by the operator to properly operate transmission mechanism used heretofore and of the general type shown in the above patent.

Another object is to provide improved transmission mechanism of the character described which is efficient and durable.

Other objects and advantages will hereinafter appear.

Transmission mechanism made in accordance with the present invention has been shown applied to an excavator crane of the type shown and described in the above Wehner patent, but of course it may be used upon other machines as well.

For the purpose of illustrating the invention, an embodiment thereof is shown in the drawings, in which Figure 1 is a side elevational view of transmission mechanism embodying the present improvements;

Fig. 2 is an end elevation, looking toward the left in Fig. 1;

Fig. 3 is an enlarged sectional view, taken on the line 3—3 of Fig. 2; and

Fig. 4 is an enlarged sectional view taken on the line 4—4 of Fig. 3.

Fig. 5 illustrates a detail to be hereinafter described.

For the purpose of illustrating the invention, part of the transmission mechanism of the type shown and described in detail in the above Wehner patent has been shown in the drawings, which part includes a drive shaft 1, commonly referred to as the digging shaft, a drum 2 loosely mounted on the latter and provided with a head 3, a driving gear 4 fixed on the shaft, a stub shaft 5 journaled in the gear for rotation therewith, and a friction clutch band 6 arranged about head 3, as shown, and being provided at one of its ends with a bolt 8 secured thereto and extending through an opening in a pin 9 fixed in the gear adjacent the edge thereof and extending outwardly therefrom, nuts 10 being threaded upon the end of the bolt and seating upon pin 9 whereby this end of band 6 is anchored securely against relative movement with respect to gear 4. An arm 11 is fixed to the stub shaft 5 and connected to the other end of band 6 in any suitable manner, an arm or lever 12 being also fixed to shaft 5 on the opposite side of the gear. From the foregoing it will be seen that upon relative rotary movement of lever 12 about the axis of shaft 5 in a counter-clockwise direction, as viewed in Fig. 1, clutch band 6 will be tightened into gripping engagement with head 3 of drum 2 whereby the latter is connected to gear 4 for rotation therewith and with the driving or digging shaft 1 to which the gear is fixed. For the purpose of causing this relative rotary movement of lever 12, a sleeve 13 is loosely mounted on shaft 1 and provided with a drum 14 and lugs 15, the lower end of lever 12 being connected to the lugs by means of a link 16. A suitable spring 17 is fixed at 18 to gear 4 and to lever 12, as shown in Fig. 1, the spring acting to urge lever 12 in a clockwise direction about the axis of shaft 5 with respect to the gear, whereby the clutch band 6 is normally held out of driving or gripping engagement with the drum head 3. It will thus be seen that when gear 4 is driven in the direction of the arrow in Fig. 1 by suitable well known means (not shown), shaft 5 and clutch band 6 and lever 12 connected to the latter, as well as sleeve 13 and drum 14 connected by link 16 to lever 12, will all rotate as a unit with gear 4 about the axis of shaft 1, and that by placing a load on drum 14 to retard rotation thereof with respect to gear 4, the drum will be caused to change its relative angular relation with respect to the gear in a counter-clockwise direction, as viewed in Fig. 1, this, in turn, causing pivotal movement of lever 12 about the axis of shaft 5 in a counter-clockwise direction and consequent tightening of clutch band 6 into gripping engagement with the drum head 3 whereby the drum 2 is connected to the gear for rotation therewith. Drum 2 may be caused to rotate at various rates of speed, ranging from zero to the rate of rotation of gear 4, this depending upon the amount of slippage allowed between clutch band 6 and head 3, which in turn is dependent upon the load placed on drum 14, the slippage between band 6 and head 3 decreasing as the load on drum 14 is increased.

The means for placing this load on drum 14 will now be described. A pair of complementary brake shoes 19 and 20 are arranged on opposite sides of drum 14, as more clearly shown in Fig. 3, and pivotally connected to the upper ends of arms 21 provided at their lower ends with hubs 22 fitting loosely on bolts 23 fixed in frame 24' of the mechanism at equal distances from either side of the vertical passing through the axis of rotation of shaft 1. A pair of parallel spaced arms 24 are formed integrally with each hub 22. An actuating member or plate 25 is supported for vertical reciprocatory movement by means hereinafter described, and is provided with slots 26 converging toward the line of movement of this member, as more clearly shown in Fig. 3. Rollers 27 are loosely fitted in slots 26 and are carried by pins 28 having their respective ends extending through and being journaled in the lower adjacent ends of arms 24, as more clearly shown in Fig. 4, the pins being held in position by any suitable means such as cotter pins 29 passing through their respective ends. The actuating member or plate 25 is enlarged at 30 to receive the upper end of a bolt 31, the lower end of the latter being threaded into an adjusting coupling member 32 threaded upon a bolt 33 pivotally connected at 34 to a lever 35 loosely mounted on a bolt 36 fixed in frame 24'. The bolt 33 and the lower end of bolt 31 are provided with opposite threads, so that by rotating the nut or coupling member 32, member 25 may be adjusted vertically with respect to lever 35. An arm 37 fixed on a shaft 38 journaled in any suitable manner in the base of frame 24' is connected to the other end of lever 35 by means of a member 39, as shown in Fig. 1, and which may also be adjustable as indicated. A second arm 40 is also fixed on shaft 38 and connected by means of a rod or link 42 to the lower end of an operating lever 43 pivotally mounted on a shaft 44.

The operation of the improved transmission mechanism is as follows:

Upon movement of lever 43 to the left, as viewed in Fig. 1, the actuating member 25 will be moved upwardly relatively with respect to rollers 27, the latter traversing grooves 26 and coacting with the respective inner edges thereof whereby arms 24 are spread outwardly away from each other and shoes 19 and 20 caused to grip drum 14 to retard rotation thereof, this action, as explained above, causing the tightening of clutch band 6 about head 3 of drum 2 whereby the latter is caused to rotate with gear 4, the rate of rotation of drum 2 as compared with that of the gear depending upon the amount of slippage allowed between band 6 and the drum head 3. This slippage, as will be seen, will decrease as the actuating member 25 moves upwardly to cause further spreading of arms 24 to increase the gripping action or engagement of shoes 19 and 20 on drum 14. Upon return movement of lever 43 to the right to its position as shown in Fig. 1, member 25 will move downwardly and the respective outer edges of grooves 26 engage rollers 27 to pull arms 24 inwardly toward each other to their respective positions as shown in Fig. 3, in which position of these arms shoes 19 and 20 will be out of engagement with drum 14 so that the latter is permitted to rotate freely with gear 4, at which time clutch band 6 will be held out of driving engagement with drum head 3 by the action of spring 17.

An important feature of the present invention resides in the fact that the position of the shoes 19 and 20 may be readily and easily controlled to regulate not only their engagement with and disengagement from the drum, but also to regulate the pressure with which they are forced against the drum 14 when engaged therewith. This permits a nicety and ease of control not heretofore had, and the control thus effected is positive and uniform throughout its range.

From the foregoing it will be seen that improved transmission mechanism of the character referred to has been provided which is simple in construction and positive in operation.

A preferred embodiment of the invention has been shown and described, but of course various changes in the size, shape and arrangement of the parts may be adopted without departing from the spirit of the invention or the scope of the claims.

The invention claimed is:

1. Means for retarding the rotation of a clutch band control drum comprising a relatively fixed shoe arranged to engage said drum to oppose rotation thereof, an actuating arm for said shoe, a slotted actuating member supported for reciprocatory movement, means connected to said arm and arranged loosely in the slot with which said member is provided whereby said shoe may be positively engaged with and positively disengaged from its drum, and operating means for imparting positive movement to said member in engaging the shoe with and disengaging it from said drum.

2. Means for retarding the rotation of a clutch band control drum comprising a relatively fixed shoe arranged to engage said drum to oppose rotation thereof and provided with parallel spaced actuating arms, a slotted actuating member supported for reciprocatory movement and fitting loosely between adjacent ends of said arms, a pin connecting said ends and extending loosely through the slot with which said member is provided whereby said movement of the latter in one direction causes operative movement of said shoe, and operating means for said member.

3. Means for retarding the rotation of a clutch band control drum comprising a pair of relatively fixed complementary shoes arranged to engage said drum to oppose rotation thereof, an actuating member supported for reciprocatory movement and provided with a pair of slots converging toward the line of movement thereof, means fitting loosely in said slots and operatively connected to said shoes whereby movement of said member in opposite directions causes simultaneous movement of said shoes into and out of gripping engagement with said drum, and operating means for imparting positive movement to said member in both directions.

4. Means for retarding the rotation of a clutch band control drum comprising a brake cooperable with said drum and including a pair of arcuate brake shoes engageable with the drum, levers fulcrumed intermediate their ends for rocking movement, one end of one arm of each of said levers carrying one of said brake shoes, a manually operable sliding cam having inclined slots, and pins carried by the ends of the levers opposite the brake shoes and operatively fitted in the slots of the cam whereby the cam controls the application and release of the brake and also varies the degree of application thereof.

5. Mechanism for braking a control drum rotatably mounted upon a frame including a pair of shoes diametrically disposed for engagement with the periphery of said drum, levers adapted to be pivotally mounted upon said frame for moving said shoes into and out of engagement with the periphery of said drum, cam means movable with respect to said levers and directly connected therewith for actuating the same to move the shoes into and out of gripping engagement with the drum, and means for imparting positive movement of said cam means in both directions.

6. Mechanism for braking a control drum including a shoe disposed for engagement with said drum, a lever pivoted to the shoe for moving the same into and out of engagement with said drum, cam means movable with respect to said lever and directly connected therewith to actuate the same, and means for imparting positive movement to said cam means in directions to cause the shoe to grip and release the drum.

7. Means for retarding the rotation of a clutch band control drum in an excavating or like machine, comprising brake shoes disposed for engagement with the drum, levers connected with shoes and pivoted intermediate their ends in the frame of the machine for moving the shoes into and out of gripping engagement with the drum for controlling the rotation thereof, cam means movable with respect to said levers and directly connected therewith for moving the same, and means for imparting positive movement to said cam means in moving the shoes into and out of engagement with the drum.

In witness whereof, I hereto affix my signature.

ARTHUR G. HENRICKS.